US010462385B2

United States Patent
Tosa et al.

(10) Patent No.: US 10,462,385 B2
(45) Date of Patent: Oct. 29, 2019

(54) DISPLAY APPARATUS FOR VEHICLE (71) Applicant: HONDA MOTOR CO., LTD., Tokyo (JP)

(72) Inventors: Mitsugu Tosa, Wako (JP); Hiroshi Yamanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 30 days.

(21) Appl. No.: 15/691,065

(22) Filed: Aug. 30, 2017

(65) Prior Publication Data

US 2018/0063447 A1   Mar. 1, 2018

(30) Foreign Application Priority Data

Aug. 31, 2016   (JP) ................................ 2016-169673

(51) Int. Cl.
| | |
|---|---|
| *H04N 5/268* | (2006.01) |
| *B60K 35/00* | (2006.01) |
| *B60R 1/00* | (2006.01) |
| *B62D 15/02* | (2006.01) |
| *H04N 5/232* | (2006.01) |
| *H04N 7/18* | (2006.01) |
| *B60K 37/06* | (2006.01) |
| *H04N 5/225* | (2006.01) |

(52) U.S. Cl.
CPC ............ *H04N 5/268* (2013.01); *B60K 35/00* (2013.01); *B60K 37/06* (2013.01); *B60R 1/00* (2013.01); *B62D 15/028* (2013.01); *B62D 15/0285* (2013.01); *H04N 5/2257* (2013.01); *H04N 5/23293* (2013.01); *H04N 7/181* (2013.01); *B60K 2370/11* (2019.05); *B60K 2370/115* (2019.05); *B60K 2370/1438* (2019.05); *B60K 2370/151* (2019.05); *B60K 2370/152* (2019.05); *B60K 2370/186* (2019.05); *B60K 2370/195* (2019.05); *B60K 2370/197* (2019.05); *B60K 2370/21* (2019.05); *B60K 2370/52* (2019.05); *B60R 2300/105* (2013.01); *B60R 2300/207* (2013.01); *B60R 2300/301* (2013.01); *B60R 2300/804* (2013.01); *B60R 2300/806* (2013.01); *B60Y 2400/301* (2013.01)

(58) Field of Classification Search
CPC .......... H04N 5/268; H04N 7/181; B60R 1/00; B62D 15/0285; B60K 35/00
USPC ......................................................... 348/148
See application file for complete search history.

(56) References Cited

U.S. PATENT DOCUMENTS

| | | | |
|---|---|---|---|
| 2009/0262045 A1* | 10/2009 | Nakano ............... | B60R 11/0235 345/32 |
| 2011/0062010 A1* | 3/2011 | Onaka .................... | B60K 37/06 200/5 C |
| 2015/0300232 A1* | 10/2015 | Matsumoto ......... | F02D 41/0235 701/32.6 |

FOREIGN PATENT DOCUMENTS

| | | | |
|---|---|---|---|
| JP | 2005-170284 A | | 6/2005 |
| JP | 2005170284 A | * | 6/2005 |

* cited by examiner

*Primary Examiner* — On S Mung
(74) *Attorney, Agent, or Firm* — Westerman, Hattori, Daniels & Adrian, LLP (57) ABSTRACT

A vehicle display apparatus includes a display control unit. The display control unit causes a video image to be displayed such that each time two (an LWC switch and an MVC switch) or more of a plurality of switch units (a switch group) successively allow switching to an ON state to generate successive interruption processes, switching between display modes is successively performed in response to the successive interruption processes. When any of the two or more switch units allows switching from the ON state to an OFF state, the display control unit causes a video image displayed just before start of the successive interruption processes to be displayed.

4 Claims, 7 Drawing Sheets

FIG. 7

DISPLAY APPARATUS FOR VEHICLE

CROSS REFERENCES TO RELATED APPLICATIONS

The present application claims priority under 35 U.S.C. § 119 to Japanese Patent Application No. 2016-169673, filed Aug. 31, 2016, entitled "Display Apparatus for Vehicle." The contents of this application are incorporated herein by reference in their entirety.

BACKGROUND

1. Field

The present disclosure relates to a vehicle display apparatus that displays a video image, including a captured image obtained by capturing an image of surroundings of a vehicle, in a form suitable for any of a plurality of display modes.

2. Description of the Related Art

A known vehicle display apparatus displays a video image, including a captured image obtained by capturing an image of surroundings of a vehicle, in a form suitable for any of a plurality of display modes. For example, various techniques have been developed to display a video image in a display mode useful for a driver while switching between display modes.

Japanese Unexamined Patent Application Publication No. 2005-170284 discloses an apparatus that, when an indicator switch or a reverse switch is switched to an ON state, preferentially generates an interruption process so that a video image is switched to another video image suitable for circumstances. As described in Japanese Unexamined Patent Application Publication No. 2005-170284, when the indicator switch or the reverse switch is switched to an OFF state, the video image is changed back to the video image displayed before the occurrence of the interruption process.

In the apparatus disclosed in Japanese Unexamined Patent Application Publication No. 2005-170284, however, if two switches A and B are successively switched to the OK state and two interruption processes A and B thus occur substantially simultaneously, the following problems may occur.

When the switch B of the two switches A and B in the OK state is switched to the OFF state to terminate the interruption process B, a video image is changed back to a video image displayed just before the termination of this process (i.e., a video image displayed in response to the interruption process A). After that, when the switch A is switched to the OFF state to terminate the interruption process A, the video image is changed back to a video image displayed just before the termination of this process (i.e., the video image displayed in response to the interruption process B).

As described above, the two kinds of video images may be repeatedly displayed in a closed-loop manner depending on the order in which the switches A and B are operated. The video image may fail to be changed back to a video image displayed before start of the operation of the switches A and B. Unfortunately, a driver of a vehicle may fail to change a display item back to an intended display item, and may be confused by such a closed-loop display event.

SUMMARY

The present disclosure has been made in view of the above-described problems. It is desirable to provide a vehicle display apparatus capable of changing a display item back to a display item intended by a driver when the driver successively switches between display modes by using a plurality of switch units to display a video image.

An aspect of the present disclosure provides a display apparatus for a vehicle. The apparatus includes an image capture unit (an image capture device) that captures an image of surroundings of the vehicle to acquire a captured image, a display unit (a display device) capable of displaying images including a video image, a display control unit (a display controller) that causes the display unit to display the images, including the captured image acquired fey the image capture unit, in a form suitable for any of a plurality of display modes, and a plurality of switch units (a plurality of switches) each allowing any of the plurality of display modes to switch between an ON state and an OFF state. The display control unit causes the display unit to display the images such that each time two or more of the plurality of switch units successively allow switching to the ON state to generate successive interruption processes, switching between the display modes is successively performed in response to the successive interruption processes. When any of the two or more switch units allows switching from the ON state to the OFF state, the display control unit causes a video image displayed just before start of the successive interruption processes to be displayed.

As described above, when any of the two or more switch units allows switching from the ON state to the OFF state, a video image displayed just before start of the successive interruption processes is displayed. This prevents a closed-loop display event, which could be caused by two or more interruption processes. Consequently, if a video image is displayed through successive switching between the display modes by using the plurality of switch units, a display item can be quickly and reliably changed back to a display item intended by a driver. In particular, this apparatus is effectively used to display a video image including a captured image in terms of immediacy because the surroundings of the vehicle change momentarily as the vehicle moves.

In this aspect, the plurality of display modes may include a transition display mode in which two or more kinds of video images are displayed while successive switching between the video images is performed. At least one of the plurality of switch units may allow each kind of video image in the transition display mode to successively switch between the ON state and the OFF state in response to operating the at least one switch unit twice or more times. In the transition display mode in which video images are displayed while successive switching between the video images is performed in response to operating a switch unit twice or more times, as the number of operations for changing a display item back to an intended display item increases, the driver is more likely to be confused if the above-described closed-loop display event occurs. In other words, the effect of quickly and reliably changing a display item back to a display item intended by the driver is further enhanced in the transition display mode.

In this aspect, the plurality of display modes may include a multi-trigger display mode that is switchable between the ON state and the OFF state by using two or more switch units. In the multi-trigger display mode in which switching between video images can be performed by using two or more switch units, as the number of units for changing a display item increases, the driver is more likely to be confused if the above-described closed-loop display event occurs. In other words, the effect of quickly and reliably changing a display item back to a display item intended by the driver is further enhanced in the multi-trigger display mode.

In this aspect, the display control unit may cause a common screen to be displayed when each of the display modes is in the OFF state. This enables the driver to understand at a glance that a display item has been changed back to an intended display item.

DESCRIPTION OF THE PREFERRED EMBODIMENTS

A vehicle display apparatus according to an embodiment of the present disclosure will be described with reference to the accompanying drawings.

Overall Configuration of Vehicle Display Apparatus 12
Overall Configuration of Vehicle 10

Figure 1:
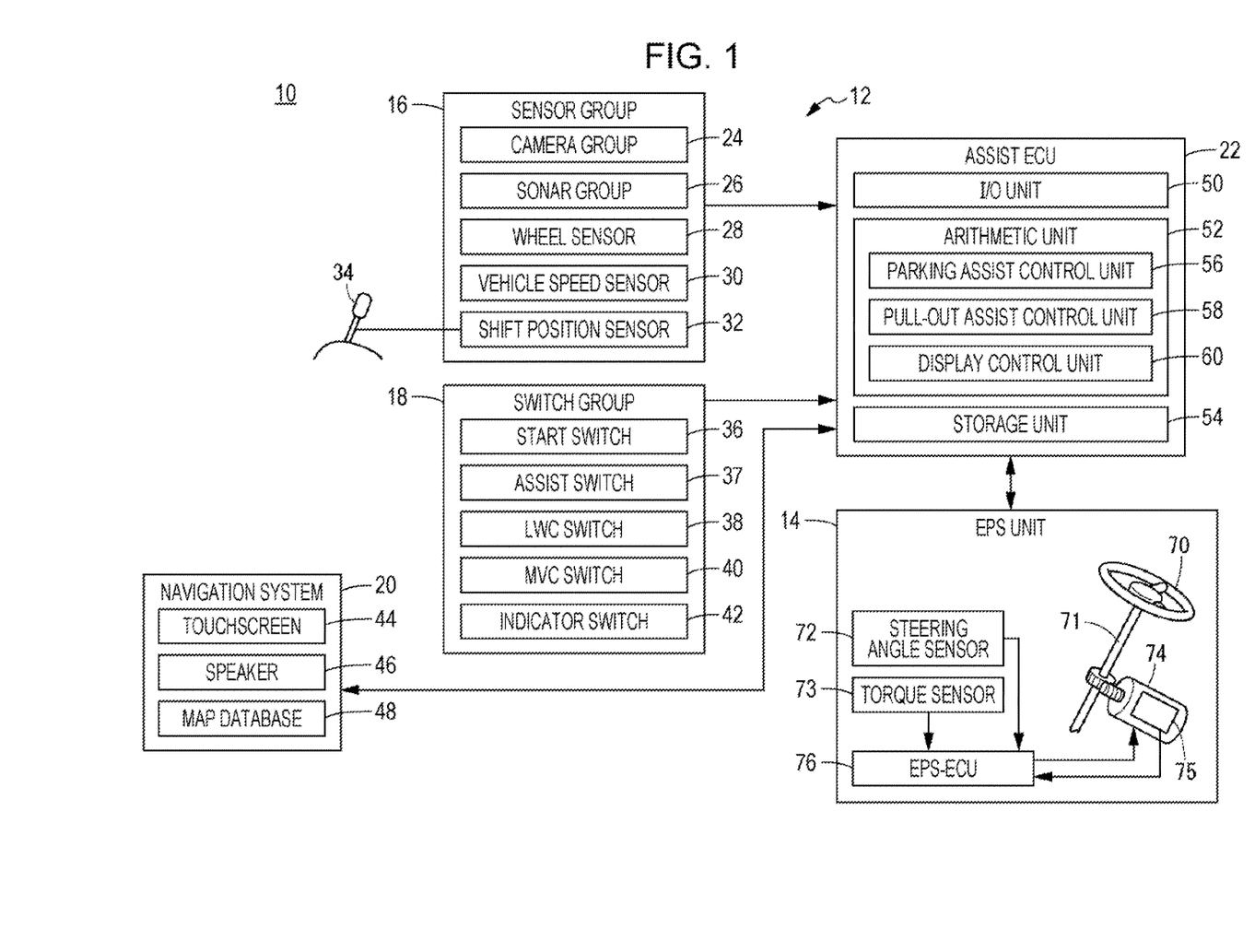
FIG. 1 is a block diagram illustrating an exemplary configuration of a vehicle equipped with a vehicle display apparatus according to an embodiment of the present disclosure.

FIG. 1 is a block diagram illustrating an exemplary configuration of a vehicle 10 equipped with a vehicle display apparatus 12 according to an embodiment of the present disclosure. The vehicle 10 is equipped with the vehicle display apparatus 12 that displays various kinds of video images and an electric power steering (EPS) unit 14.

The vehicle display apparatus 12 and the EPS unit 14 cooperate with each other to perform assist control including parking assist control and pull-out assist control. To park the vehicle 10 into a target parking space or pull out the vehicle 10 out of the parking space by automatic steering, the EPS unit 14 causes a steering wheel 70 to be automatically operated, and a driver of the vehicle 10 operates an accelerator pedal (not illustrated), a brake pedal (not illustrated), and a shift lever 34.

The vehicle display apparatus 12 includes a sensor group 16, a switch group (or switch units) 18, a navigation system 20, and an assist electronic control unit (ECU) 22 that is responsible for the above-described assist control.

Configuration of Sensor Group 16

The sensor group 16 includes a plurality of sensors capable of detecting various kinds of information used in the assist control. Specifically, the sensor group 16 includes a camera group (image capture unit) 24, a sonar group 26, a wheel sensor 28, a vehicle speed sensor 30, and a shift position sensor 32.

The camera group 24 includes one or more cameras capable of capturing an image of surroundings of the vehicle 10 and acquires a captured image representing the surroundings of the vehicle 10. For example, the camera group 24 includes four cameras: a front camera disposed on front part of a vehicle body; a rear camera disposed on rear part of the vehicle body; a right side camera (or rear right side camera) disposed on outer lower part of a right door mirror; and a left side camera (or rear left side camera) disposed on outer lower part of a left door mirror.

The sonar group 26 includes one or more sonars capable of emitting a sound wave and receiving sound reflected from an object, and sequentially outputs detection signals indicative of a distance between the vehicle 10 and an object. For example, the sonar group 26 includes eight sonars such that one sonar is disposed on each of front left part, a front left side, a front right side, front right part, rear left part, a rear left side, a rear right side, and rear right part of the vehicle body.

The wheel sensor 28 is an angle sensor or a displacement sensor that detects the angle of rotation of each wheel. The wheel sensor 28 is capable of determining a travel distance on the basis of detection pulses whose number is correlated with the number of rotations of the wheel. The vehicle speed sensor 30 detects a speed of the vehicle body. The vehicle speed sensor 30 is capable of determining a vehicle speed on the basis of the number of rotations of, for example, a drive shaft of a transmission.

The shift position sensor 32 outputs a detection signal indicative of a shift position selected in accordance with a driver's operation of the shift lever 34 (or a selector). The shift lever 34 is a device capable of selecting any one of, for example, six shift positions: a parking range (P), a reverse range (R), a neutral range (N), a drive range (D), a second range (2), and a low range (L).

Configuration of Switch Group 18

The switch group 18 includes a plurality of switches to be operated by the driver. Specifically, the switch group 18 includes a start switch 36, an assist switch 37, a lane watch camera (LWC) switch 38, a multi-view camera (MVC) switch 40, and an indicator switch 42.

The start switch 36 starts or stops a driving source (e.g., an engine and a motor) of the vehicle 10 when turned on or off by the driver. The start switch 36 is a hardware switch disposed on, for example, an instrument panel (not illustrated) in a vehicle interior of the vehicle 10.

The assist switch 37 includes an assist selection switch to select either one of the parking assist control and the pull-out assist control, an assist start switch to start the assist control, and an assist termination switch to terminate the assist control. The assist switch 37 is a software switch displayed on a touchscreen 44 of the navigation system 20.

The LWC switch 38 causes the touchscreen 44 to display a video image in a form suitable for an LWC display mode, which will be described later, when turned on by the driver. The LWC switch 38 is a hardware switch disposed orb for example, a free end of an indicator lever (not illustrated).

The MVC switch 40 causes the touchscreen 44 to display a video image in a form suitable for an MVC display mode, which will be described later, when turned on by the driver. The MVC switch 40 is a hardware switch disposed on, for example, the instrument panel or the free end of the indicator lever.

The indicator switch 42 turns on or off a direction indicator in response to a driver's operation of the indicator lever. In addition, the indicator switch 42 causes the touchscreen 44 to display a video image in the form suitable for the LWC display mode, which will be described later, when turned on by the driver.

Configuration of navigation System 20

The navigation system 20 gives video or audio information about a route to a destination to an occupant, including the driver, of the vehicle 10. The navigation system 20 includes the touchscreen (display unit) 44, a speaker 46, and a map database 48.

The touchscreen 44, which is a display with a touch sensor, functions as a human-machine interface (HMI) concerned with execution of the assist control. The speaker 46 outputs, for example, not only audio information including music and radio broadcasts but also guidance speech concerning a route or a driving operation. The map database 48 stores position information concerning, for example, roads, intersections, and facilities around the vehicle.

Configuration of Assist ECU 22

The assist ECU 22 includes, as hardware, an input and output (I/O) unit 50, an arithmetic unit 52, and a storage unit 54. The I/O unit 50 receives, for example, detection information from the sensors of the sensor group 16 and operation information related to the switches of the switch group 18. The storage unit 54 stores programs to be executed by the arithmetic unit 52 and various information items.

The arithmetic unit 52 includes a processor, such as a central processing unit (CPU) or a micro-processing unit (MPU), The arithmetic unit 52 performs arithmetic processing in accordance with the programs stored in the storage unit 54, thus functioning as a parking assist control unit 56, a pull-out assist control unit 58, and a display control unit 60.

Configuration of EPS Unit 14

The EPS unit 14 includes the steering wheel 70, a steering column 71, a steering angle sensor 72, a torque sensor 73, an EPS motor 74, a resolver 75, and an EPS-ECU 76.

The steering angle sensor 72 detects a steering angle of the steering wheel 70. The torque sensor 73 detects a torque applied to the steering wheel 70. The EPS motor 74 applies a driving force or a reaction force to the steering column 71 coupled to the steering wheel 70. The resolver 75 detects an angle of rotation of the EPS motor 74.

The EPS-ECU 76 controls the entire EPS unit 14. Like the assist ECU 22, the EPS-ECU 76 includes, as hardware, an I/O unit, an arithmetic unit, and a storage unit, which are not illustrated.

Outline of Parking Assist Control

The parking assist control unit 56 of the assist ECU 22 starts parking assist control of the vehicle 10 in response to an operation of the assist switch 37, serving as a parking assist start switch. The navigation system 20 outputs guidance for parking assist during execution of the parking assist control. Specifically, the display control unit 60 causes the touchscreen 44 to output visible information (a parking assist (PA) screen in the MVC display mode) about parking assist in accordance with an output instruction from the parking assist control unit 56. In addition, the navigation system 20 causes the speaker 46 to output audio information about parking assist.

For example, in automatic steering, the navigation system 20 outputs guidance to prompt the driver to operate the accelerator pedal, the brake pedal, or the shift lever at appropriate timing. Additionally, the parking assist control unit 56 inputs a control signal for changing the steering angle of the steering wheel 70 to a target value to the EPS-ECU 16 at appropriate timing, including the time to perform, a wheel turning operation. As described above, the parking assist control unit 56 continues the parking assist control until the vehicle 10 reaches a target parking position or until the driver performs a predetermined operation for giving an instruction to terminate parking assist.

Outline of Pull-out Assist Control

The pull-out assist control unit 58 of the assist ECU 22 starts pull-out assist control of the vehicle 10 in response to an operation of the assist switch 37, serving as a pull-out assist start switch. The navigation system 20 outputs guidance for pull-out assist during execution of the pull-out. assist control. Specifically, the display control unit 60 causes the touchscreen 44 to output visible information (a pull-out assist (POA) screen in the MVC display mode) about pull-out assist in accordance with an output instruction from the pull-out assist control unit 58. In addition, the navigation system 20 causes the speaker 46 to output audio information about pull-out assist.

For example, in automatic steering, the navigation system 20 outputs guidance to prompt the driver to operate the accelerator pedal, the brake pedal, or the shift lever at appropriate timing. Additionally, the pull-out assist control unit 58 inputs a control signal for changing the steering angle of the steering wheel 70 to a target value to the EPS-ECU 76 at appropriate timing, including the time to perform the wheel turning operation. As described above, the pull-out assist control unit 58 continues the pull-out assist control until the vehicle 10 reaches a target position at. which the vehicle 10 can pull out of a parking space or until the driver performs a predetermined operation for giving an instruction to terminate pull-out assist.

Video Image Display Control by Display Control Unit 60

Video image display control by the display control unit 60 during normal travel or assist control of the vehicle 10 will now be described. The term "video image display control" as used herein refers to control for causing the touchscreen 44 to display a video image in a form suitable for any of a plurality of display modes (i.e., a display audio (DA) display mode, the LWC display mode, and the MVC display mode).

The term "DA display mode" as used herein refers to a mode that displays a video image including a navigation screen or an audio screen to provide various information items (visual information or auditory information) that assist the occupant of the vehicle 10 in driving the vehicle. The term "LWC display mode" as used herein refers to a mode that displays a video image including a captured image acquired by any of the rear side cameras to allow the occupant of the vehicle 10 to visually check conditions of a neighboring lane. The term "MVC display mode" as used herein refers to a mode that displays a video image including a high-angle shot image obtained by combining images captured, in four directions to allow the occupant of the vehicle 10 to visually check conditions of the surroundings of the vehicle 10.

The vehicle display apparatus 12 includes a plurality of switch units each allowing any of the display modes to switch between an ON state and an OFF state. In the following description, it is assumed that each time two or more of the switch unis successively allow switching to the ON state to generate successive interruption processes, the display control unit 60 successively switches between the display modes in response to the successive interruption processes to display a video image.

Figure 2:
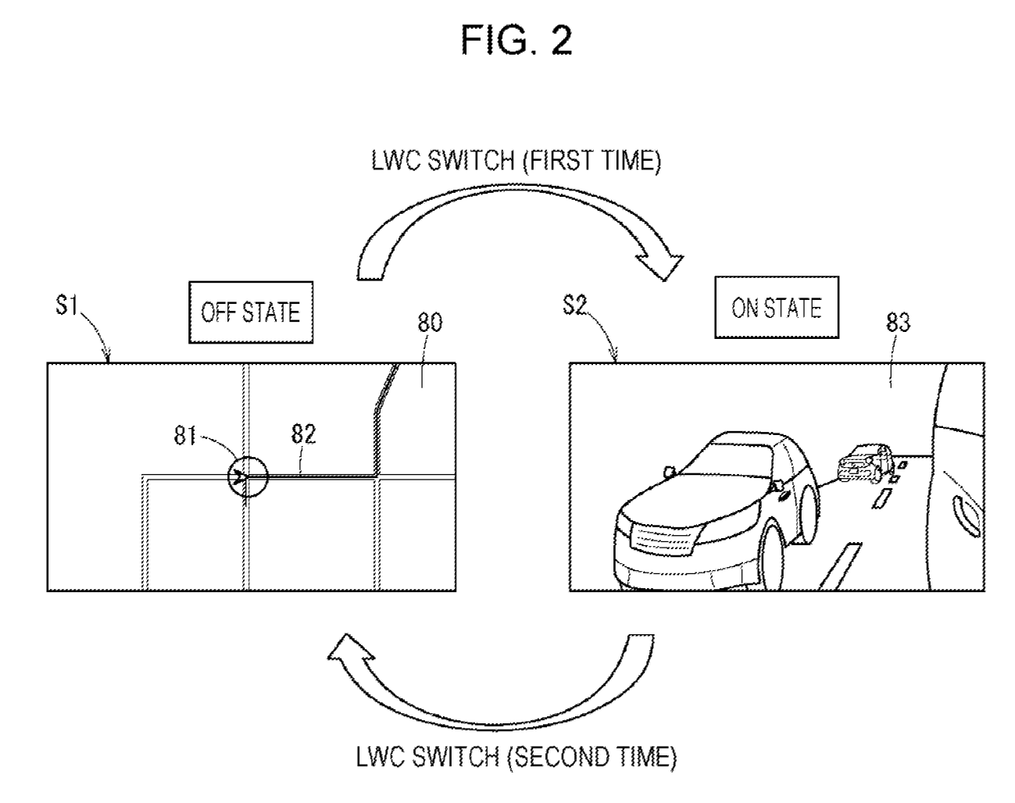
FIG. 2 is a diagram illustrating a transition between screens in a lane watch camera (LWC) display mode.

FIG. 2 is a diagram illustrating a transition between screens in the LWC display mode. While the LWC switch 38 is in an OFF state, a given video image (a map screen S1 in this case) in the DA display mods is displayed on the touchscreen 44. On the other hand, while the LWC switch 38 is in an ON state, one kind of video image (a lane watch screen S2 in this case) is displayed on the touchscreen 44.

The map screen S1 represents a video image (frame image) including a map 80 corresponding to a map of an area around the vehicle 10, a pointer 81 indicative of the position of the vehicle 10 in the map 80, and a route mark 82 indicative of a recommended route for the vehicle 10 calculated by the navigation system 20. The lane watch screen S2 represents a video image (frame image) including a rearward image 83, captured by the rear right side camera, representing the surroundings of the vehicle 10.

As the driver repeatedly presses the LWC switch 38, the video image displayed on the touchscreen 44 is successively changed in the order of the map screen S1, the lane watch screen S2, the map screen S1, the lane watch screen S2, . . . .

If the indicator switch 42 is turned on and off instead of the LWC switch 38, the same transition between the screens as that in FIG. 2 will occur. In other words, the LWC display mode corresponds to a multi-trigger display mode that is switchable between the ON state and the OFF state by using two or more switch units.

Figure 3:
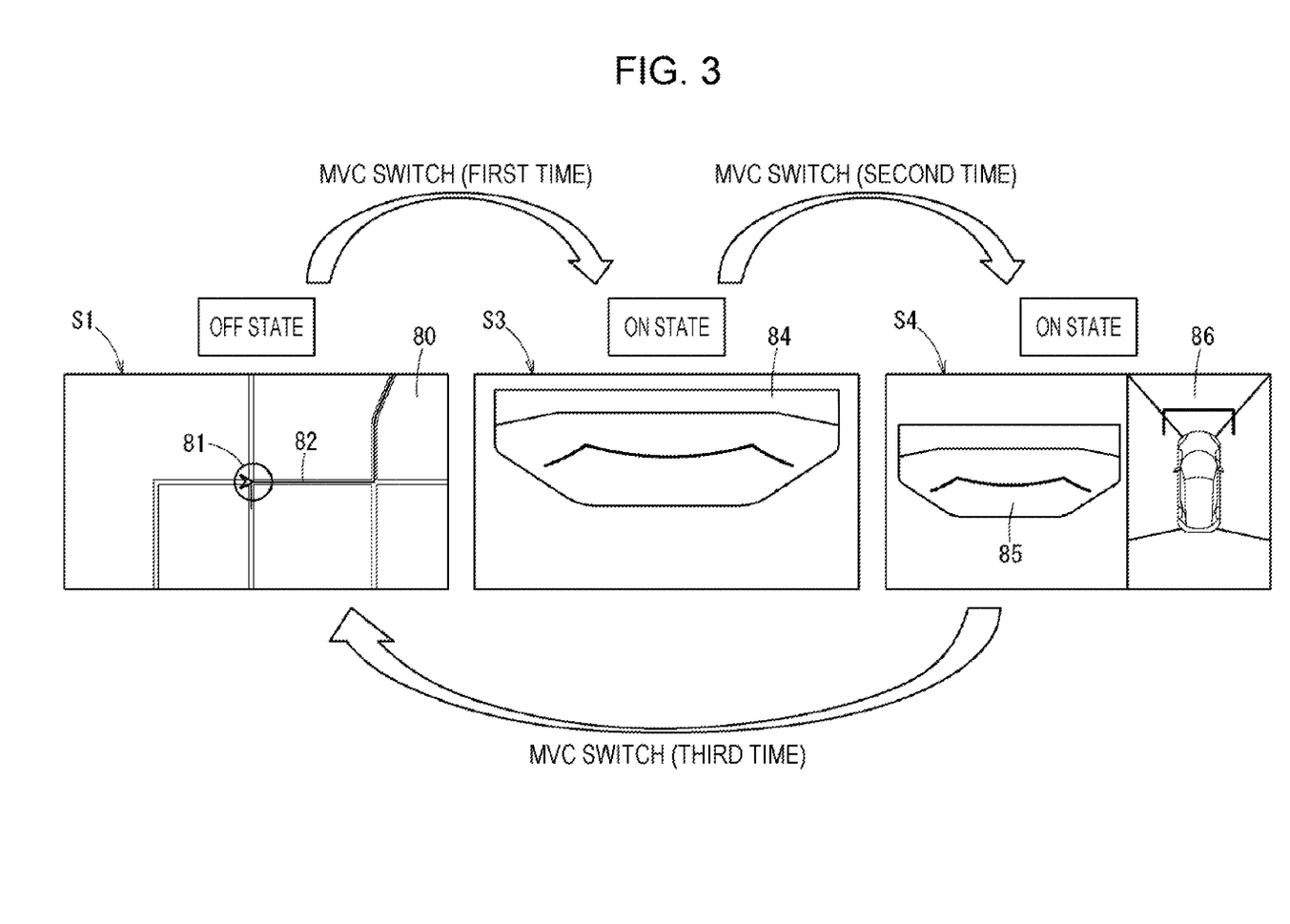
FIG. 3 is a diagram illustrating transitions between screens in a multi-view camera (MVC) display mode.

FIG. 3 is a diagram illustrating transitions between screens in the MVC display mode. While the MVC switch 40 is in the OFF state, a given video image (the map screen S1 in this case) in the DA display mode is displayed on the touchscreen 44. On the other hand, while the MVC switch 40 is in the ON state, two kinds of video images (a first multi-view screen S3 and a second multi-view screen S4 in this case) are successively displayed on the touchscreen 44.

The first multi-view screen S3 represents a video image (frame image) including a rearward image 84, captured by a camera oriented in the direction of travel (the rear camera in this case), representing the surroundings of the vehicle 10. The second multi-view screen S4 represents a video image (frame image) including a rearward image 85, captured by a camera oriented in the direction of travel (the rear camera in this case), representing the surroundings of the vehicle 10 and a high-angle shot image 86, obtained by processing and combining images captured in the four directions, representing a state of the vehicle 10 viewed from above.

As the driver repeatedly presses the MVC switch 40, the video image displayed on the touchscreen 44 is successively changed in the order of the map screen S1, the first multi-view screen S3, the second multi-view screen S4, the map screen S1, the first multi-view screen S3.

As described above, switching between the video images is successively performed in response to operating the MVC switch 40 twice or more times such that switching to the ON state (or the OFF state) of a video image is selected. In other words, the MVC display mode corresponds to a transition display mode in which successive switching between, two or more kinds of video images can be performed by using one switch unit.

First State Transition

Figure 4:
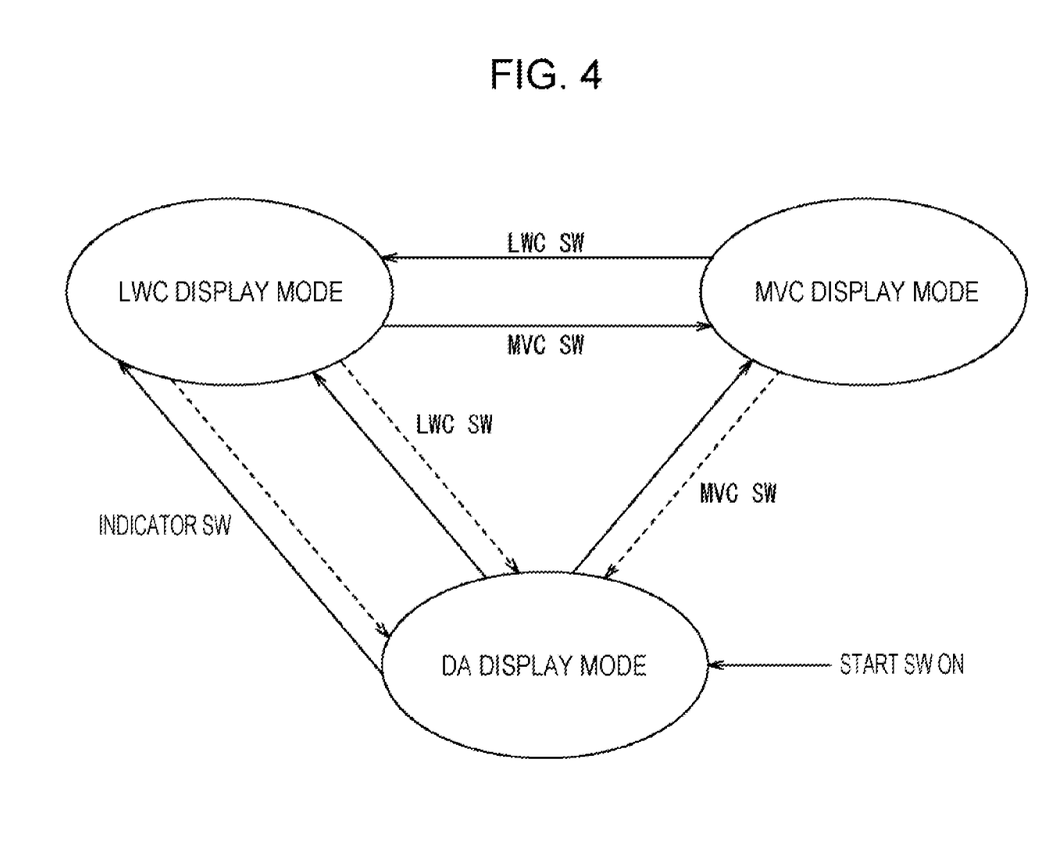
FIG. 4 is a diagram illustrating a first state transition in video image display control by a display control unit illustrated in FIG. 1.

FIG. 4 is a diagram illustrating a first state transition in video image display control by the display control unit 60 in FIG. 1. In FIG. 4, full-line arrows each represent switching from the OFF state to the ON state of a switch and dotted-line arrows each represent switching from the ON state to the OFF state of a switch.

The display control unit 60 enters the DA display mode in response to turning on the start switch 36.

The display control unit 60 accepts start of an interruption process in response to, as a trigger, turning on the LWC switch 38, thus shifting from the DA display mode to the LWC display mode. Furthermore, the display control, unit 60 accepts termination of the interruption process in response to, as a trigger, turning off the LWC switch 38, thus shifting from the LWC display mode to the DA display mode.

The display control unit 60 accepts start of an interruption process in response to, as a trigger, turning on the indicator switch 42, thus shifting from the DA display mode to the LWC display mode. Furthermore, the display control unit 60 accepts termination of the interruption process in response to, as a trigger, turning off the indicator switch 42, thus shifting from the LWC display mode to the DA display mode.

The display control unit 60 accepts start of an interruption process in response to, as a trigger, turning on the MVC switch 40, thus shifting from the DA display mode to the MVC display mode. Furthermore, the display control unit 60 accepts termination of the interruption process in response to, as a trigger, turning off the MVC switch 40, thus shifting from the MVC display mode to the DA display mode.

The display control unit 60 accepts start of an interruption process in response to, as a trigger, turning on the MVC switch 40, thus shifting from the LWC display mode to the MVC display mode. Furthermore, the display control unit 60 accepts termination of the interruption process in response to, as a trigger, turning on the LWC switch 38, thus shifting from the MVC display mode to the LWC display mode.

Transitions between Display Items in Comparative Example

Figure 7:
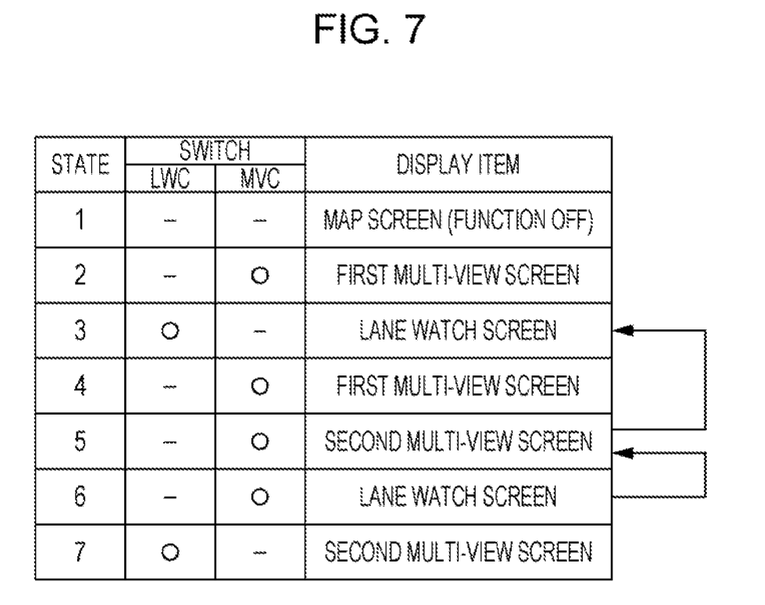
FIG. 7 is a diagram schematically illustrating transitions between display items in Comparative Example.

FIG. 7 is a diagram schematically illustrating transitions between display items in Comparative Example. More specifically, FIG. 7 is a time-series table illustrating video images, serving as display items, changed in response to operating a switch in accordance with a procedure.

In an initial state, both the LWC switch 38 and the MVC switch 40 are off and the map screen S1 is displayed (state 1). Then, pressing the MVC switch 40 once causes an interruption process for the MVC display mode to occur, thus changing the display item to the first multi-view screen S3 (state 2). Then, pressing the LWC switch 38 once causes an interruption process for the LWC display mode to occur, thus changing the display item to the lane watch screen S2 (state 3).

Then, pressing the MVC switch 40 once restarts the MVC display mode, thus again displaying the first multi-view screen S3, serving as the last display item (state 4). Then, successively pressing the MVC switch 40 once causes the display item to be changed to the second multi-view screen S4 (state 5).

Then, successively pressing the MVC switch 40 once terminates the interruption process for the MVC display mode (state 6). In the state 6, the lane watch screen S2 displayed (in the state 3) just before restart of the MVC display mode is again displayed.

Then, pressing the LWC switch 38 once terminates the interruption process for the LWC display mode (state 7), In the state 7, the second multi-view screen S4 displayed (in the state 5) just before restart of the LWC display mode is again displayed.

As described above, two kinds of video images are repeatedly displayed in a closed-loop manner depending on the order in which the LWC switch 38 and the MVC switch 40 are operated. The display item may fail to be changed back to the video image (the map screen S1) displayed before the operation of the LWC switch 38 and the MVC switch 40. Unfortunately, the driver of the vehicle 10 may fail to change the display item back to an intended display item and may be confused by such an event.

Transitions between Display Items in Embodiment

Figure 5A:
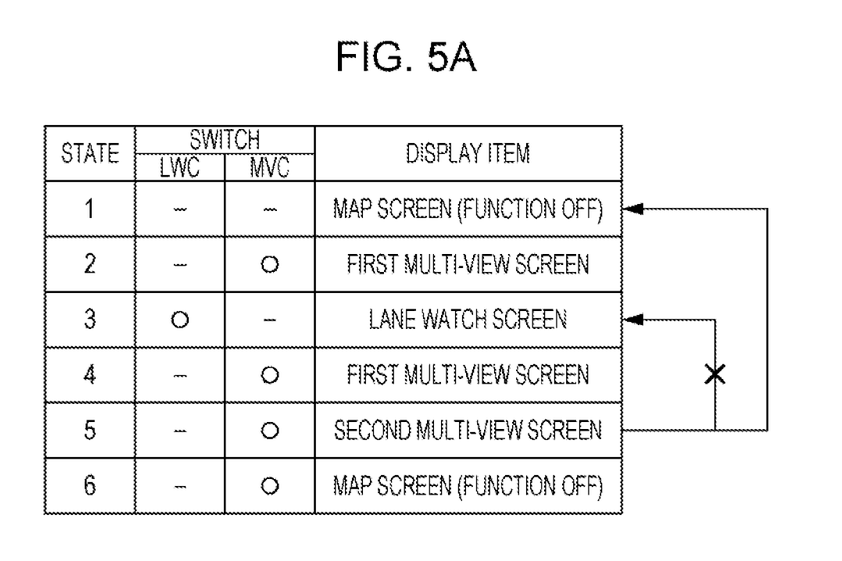
FIGS. 5A and 5B are diagrams schematically illustrating transitions between display items in the embodiment.
Figure 5B:
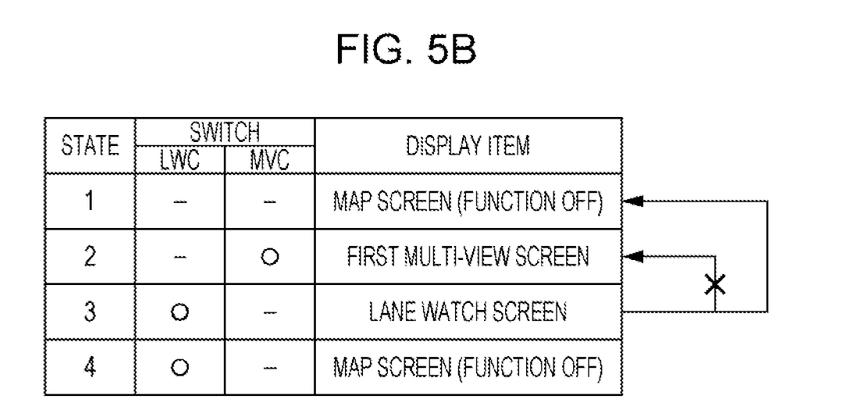

FIGS. 5A and 5B are diagrams schematically illustrating transitions between display items in the present embodiment. The tables illustrated in FIGS. 5A and 5B have the same definition as that of the table in FIG. 7.

Referring to FIG. 5A, in the initial state, both the LWC switch 38 and the MVC switch 40 are off and the map screen S1 is displayed (state 1). Then, pressing the MVC switch 40 once turns on the MVC switch 40, so that an interruption process for the MVC display mode occurs. Consequently, the display item is changed to the first multi-view screen S3 (state 2). Then, pressing the LWC switch 33 once turns on the LWC switch 38, so that an interruption process for the LWC display mode occurs. Thus, the display item is changed to the lane watch screen S2 (state 3).

Then, pressing the MVC switch 40 once restarts the MVC display mode, thus again displaying the first multi-view screen S3, serving as the last display item (state 4). Then, successively pressing the MVC switch 40 once causes the display item to be changed to the second multi-view screen S4 (state 5).

Then, successively pressing the MVC switch 40 once causes the map screen S1 displayed (in the state 1) just before start of the successive interruption processes for the MVC display mode and the LWC display mode to be displayed. As described above, a display item can be quickly and reliably changed back to a display item intended by the driver.

Particularly, in the case where the display modes include the transition display mode (MVC display mode; and at least one switch unit (MVC switch 40) allows each kind of video image to successively switch between the ON state and the OFF state in response to operating the at least one switch twice or more times, as the number of operations for changing a display item back to an intended display item increases, the driver is more likely to be confused if a closed-loop display event, as illustrated in FIG. 7, occurs. In other words, the effect of quickly and reliably changing a display item back to a display item intended by the driver is further enhanced in the transition display mode.

Referring to FIG. 5B, in the initial state, both the LWC switch 38 and the MVC switch 40 are off and the map screen S1 is displayed (state 1). Then, pressing the MVC switch 40 once turns on the MVC switch 40, so that an interruption process for the MVC display mode occurs. Thus, the display item is changed to the first multi-view screen S3 (state 2). Then, pressing the LWC switch 38 once turns on the LWC switch 38, so that an interruption process for the LWC display mode occurs. Thus, the display item is changed to the lane watch screen S2 (state 3).

Then, successively pressing the LWC switch 38 once causes the map screen S1, displayed (in the state 1) just before start of the successive interruption processes for the MVC display mode and the LWC display mode, to be displayed. As described above, a display item can be quickly and reliably changed back to a display item intended by the driver.

Particularly, in the case where the display modes include the multi-trigger display mode (LWC display mode), as the number of units for changing a display item increases, the driver is more likely to be confused if a closed-loop display event, as illustrated in FIG. 7, occurs. In other words, the effect of quickly and reliably changing a display item back to a display item intended by the driver is further enhanced in the multi-trigger display mode.

In one or more embodiments, the display control unit 60 may cause a common screen (e.g., the map screen S1 in the DA display mode) while each of the display modes (the MVC display mode and the LWC display mode) is in the OFF state. This enables the driver to understand at a glance that, a display item has been changed back to an intended display item.

Second State Transition

Figure 6:
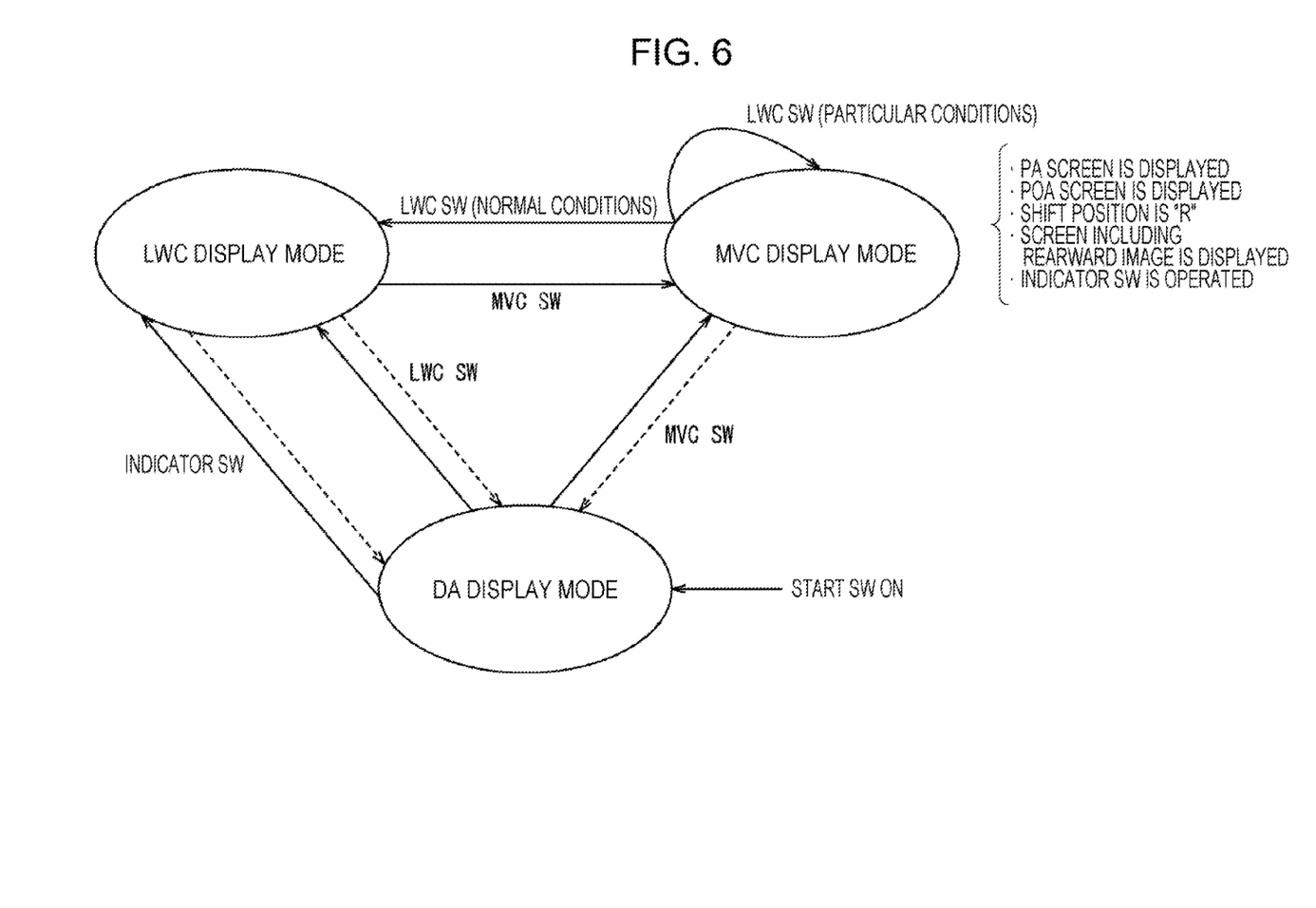
FIG. 6 is a diagram illustrating a second state transition in video image display control by the display control unit in FIG. 1.

FIG. 6 is a diagram illustrating a second state transition in video image display control by the display control unit 60 in FIG. 1. In FIG. 6, full-line arrows each represent switching from the OFF state to the ON state of a switch and dotted-line arrows each represent switching from the ON state to the OFF state of a switch.

FIG. 6 illustrates substantially the same details as those in FIG. 4, except, for conditions for shifting from the MVC display mode to the LWC display mode.

When the display control unit 60 accepts start of an interruption process in response to, as a trigger, turning on the LWC switch 38, the display control unit 60 shifts from the MVC display mode to the LWC display mode under normal conditions. When particular conditions (hereinafter, referred to as "shift inhibition conditions") are satisfied, the display control unit 60 remains in the MVC display mode.

The shift inhibition, conditions include a first condition in which the PA screen is displayed, a second condition in which the PDA screen is displayed, a third condition in which the shift position is the position R, a fourth condition in which the screen (the first multi-view screen S3 or the second multi-view screen 34) including the rearward image 84 or 85 is displayed, and a fifth condition in which the indicator switch 42 is operated. The term "satisfaction of the shift inhibition conditions" as used herein refers to satisfaction of at least one of the first to fifth conditions.

If any of the above-described first to fourth conditions is satisfied, the vehicle 10 is probably performing any of the following actions: parking, pulling out of a parking space, and reversing. Under such a condition, the driver has to pay great attention to the surroundings of the vehicle 10. The MVC display mode is maintained to eliminate a likelihood that switching from the MVC display mode to the LWC display mode may divert the driver's attention away from, the surroundings.

During implementation of the MVC display mode, the driver may operate the indicator lever while driving the vehicle 10 involving moving the vehicle laterally or passing, for example, another vehicle. If the operation of the indicator lever triggers switching to the LWC display mode, the display item would be changed each time the indicator lever is operated, thus annoying the driver. For this reason, switching to another display mode is inhibited when the above-described fifth condition is satisfied. Thus, the problem of diverting the driver's attention away from the surroundings of the vehicle and the annoyance of switching between the display modes or items can be simultaneously overcome.

Advantages of Vehicle Display Apparatus 12

As described above, the vehicle display apparatus 12 includes: (1) the camera group (image capture unit) 24 that captures an image of the surroundings of the vehicle 10 to acquire a captured image (e.g., a side-rearward image 83, the rearward image 84 or 85, or the high-angle snot image 86); (2) the touchscreen (display unit) 44 capable of displaying a video image; (3) the display control unit 60 that causes the touchscreen 44 to display a video image including the captured image in a form suitable for any of the display modes; and (4) the switch group (switch units) 18 allowing any of the display modes to switch between the ON state and the OFF state.

The display control unit 60 functions as follows: (5) each time two or more switch units (the LWC switch 38, the MVC switch 40, and the indicator switch 42) of the switch group 18 successively allow switching to the OK state to generate successive interruption processes, the display control unit 60 successively switches between the display modes in response to the successive interruption processes to display a video image; and (6) when any of the LWC switch 38, the MVC switch 40, and the indicator switch 42 allows switching from the OK state to the OFF state, the display control unit 60 causes a video image (e.g., the map screen S1) displayed just before start of the successive interruption processes to be displayed.

As described above, when any of the LWC switch 38, the MVC switch 40, and the indicator switch 42 allows switching from the ON state to the OFF state, a video image displayed just before start of the successive interruption processes is displayed. This prevents a closed-loop display event, which could be caused by two or more interruption processes. Consequently, if a video image is displayed through successive switching between the display modes by using the switch group 18, a display item can be quickly and reliably changed back to a display item intended by the driver. In particular, this apparatus is effectively used to display a video image including a captured image in terms of immediacy because the surroundings of the vehicle 10 change momentarily as the vehicle 10 moves.

Supplement

The above-described embodiments are not intended to limit the present disclosure. It should be understood by those skilled In the art that various modifications and changes can be made without departing from the sprit and scope of the present disclosure.

For example, the number of image capture units, display modes, switch units, or video images is not limited to that described as an example in the above-described embodiments and may be changed to any number. Furthermore, screen layout patterns, the kinds of captured images, and the kinds of switch units are not limited to those described in the above-described embodiments. For example, the captured images may include only forward images.

What is claimed is:

1. A display apparatus for a vehicle, the apparatus comprising: an image capture device configured to capture an image of surroundings of the vehicle to acquire a captured image;
   a display device configured to display images including the captured image; a display controller configured to cause the display device to display the images in a plurality of display modes which include a first display mode and a second display mode; and
   a plurality of switches including a first switch and a second switch and each configured to allow the display controller to switch each of the first and second display modes between an ON state and an OFF state, thereby selectively displaying the images of the corresponding display mode,
   wherein the display controller is configured to perform a successive interruption process which successively switches the images to be displayed in response to a successive operation of two or more of the corresponding switches to be the ON state such that the image of the second display mode is displayed by interrupting the first display mode when the second display mode is turned on during the display of the image of the first display mode and that the image of the first display mode is displayed by interrupting the second display mode when the first display mode is turned on during the display of the image of the second display mode, and
   wherein when any one of the first and second switches is switched from the ON state to the OFF state in the successive interruption process, the display controller causes the display device to display an image which was displayed immediately before the successive interruption process.

2. The apparatus according to claim 1,
   wherein the plurality of display modes include a transition display mode in which two or more of images are successively displayed, and
   wherein at least one of the plurality of switches allows each kind of image in the transition display mode to successively switch between the ON state and the OFF state in response to an operation of the at least one of the plurality of switches twice or more times.

3. The apparatus according to claim 1, wherein the plurality of display modes include a multi-trigger display mode that is switchable between the ON state and the OFF state by operating two or more of switches.

4. The apparatus according to claim 1, wherein the display controller causes a common screen image to be displayed when each of the display modes is in the OFF state.

* * * * *